United States Patent [19]
Eisemann

[11] 3,894,740
[45] July 15, 1975

[54] SWITCHING DEVICE, PARTICULARLY FOR A RECORD PLAYER OR CHANGER

[75] Inventor: Kurt Eisemann, Berlin, Germany

[73] Assignee: U.S. Philips Corporation, New York, N.Y.

[22] Filed: Sept. 28, 1973

[21] Appl. No.: 401,717

[30] Foreign Application Priority Data
Oct. 13, 1972 Germany.......................... 2250178

[52] U.S. Cl............................................... 274/1 R
[51] Int. Cl........................................... G11b 15/00
[58] Field of Search.................. 274/9 R, 10 R, 1 R; 200/293, 294, 296, 153 LB, 153 V, 17 R

[56] References Cited
UNITED STATES PATENTS

| | | | |
|---|---|---|---|
| 3,493,232 | 2/1970 | Tatter et al. | 274/10 R |
| 3,586,806 | 6/1971 | Swisher | 200/294 |
| 3,624,330 | 11/1971 | Bogner et al. | 200/153 V |
| 3,794,332 | 2/1974 | Bailey | 274/10 R |
| 3,801,109 | 4/1974 | Kolomayets et al. | 274/10 R |
| 3,805,004 | 4/1974 | Kondo et al. | 200/296 |

*Primary Examiner*—Richard E. Aegerter
*Assistant Examiner*—Steven L. Stephan
*Attorney, Agent, or Firm*—Frank R. Trifari; David R. Treacy

[57] ABSTRACT

A switching device for a record player or a changer for initiating the playing cycle of a grammophone record. A switching knob pivoted above a mounting plate cooperates with a control device underneath the mounting plate. A bearing spindle, on which the control device is assembled by fitting the individual parts including the drum, is latched to the mounting plate.

4 Claims, 3 Drawing Figures

SWITCHING DEVICE, PARTICULARLY FOR A RECORD PLAYER OR CHANGER

Figure 1:
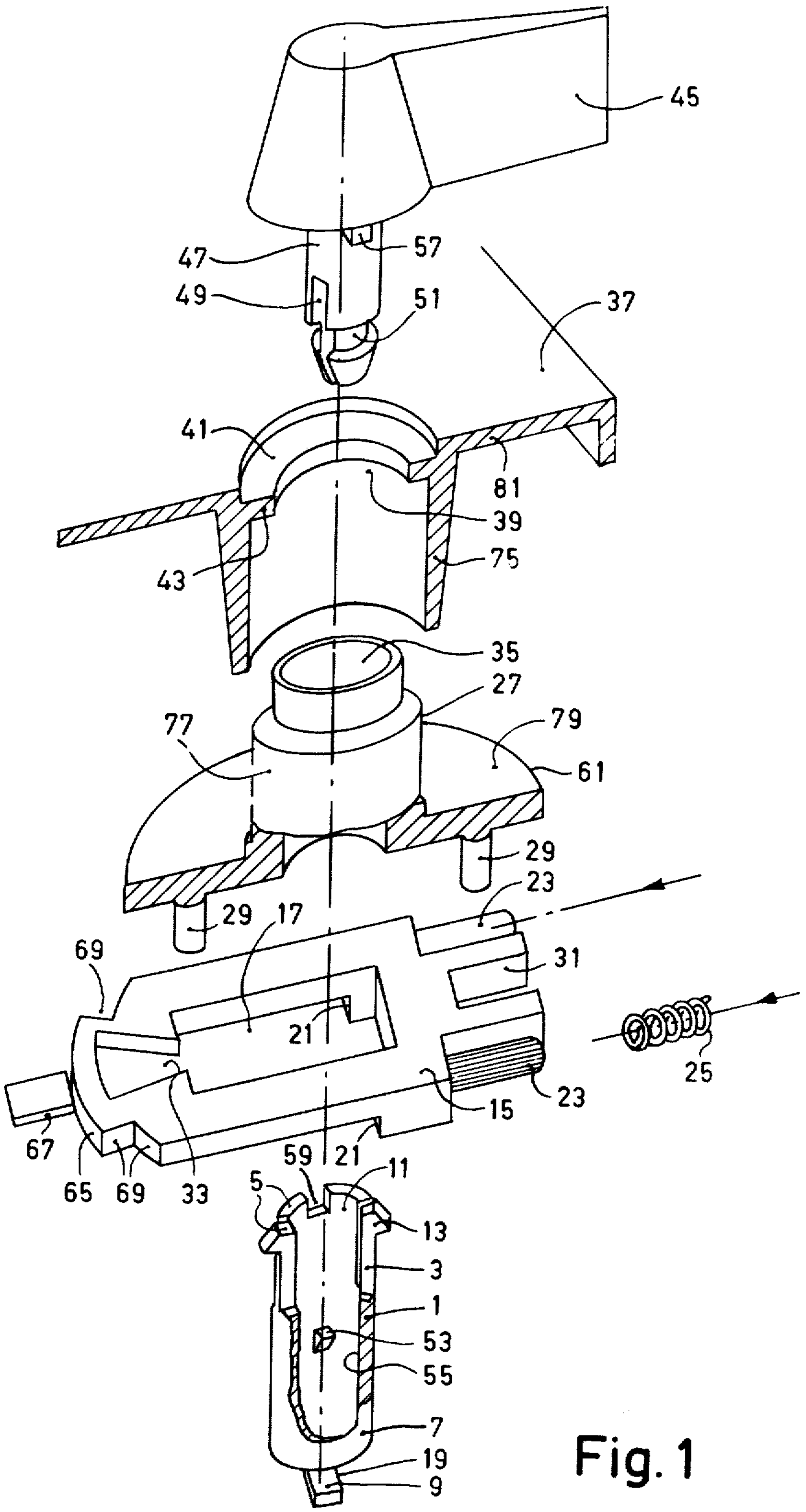

The invention relates to a switching device, particularly for a record player or changer for the switching and control operations to be performed for initiating the playing cycle of a grammophone record, comprising a switching knob pivoted above a mounting plate, which knob cooperates with a control device underneath the mounting plate which is mounted to said plate.

When attempting to simplify a record player or record changer hereinafter referred to as a record player, it is essential that the individual switching operations be performed by means of a switching mechanism of as economical and reliable as possible a construction. This also involves designing the components for simplicity and so as to enable easy mounting. Up to now switches and control devices have usually been secured to the mounting plate of the apparatus by means of screws, which requires many component parts and which results in high assembly costs.

It is an object of the invention to simplify the assembly of a switching device of a record player by means of a different mounting construction.

According to the invention a bearing spindle, on which the control device is assembled by fitting the individual parts including a switching drum onto said spindle, is latched by means of projecting barbs to the mounting plate. The switching knob, in its turn, can then be latched onto the bearing spindle. Accordingly, the entire mounting procedure merely consists of stacking the individual parts of the control device and pressing the bearing spindle into the mounting plate and the knob spindle into the bearing spindle. These simple operations may easily be performed faultlessly by unskilled labor.

In a further embodiment of the invention a slide provided with a curved stop surface is fitted on the bearing spindle, which is provided with actuating cams which cooperate with said slide, and pins of a drum body which is also fitted on the bearing spindle and the slide engage with the slide which is movable relative to said spindle.

In a further embodiment of the invention the top edge of the bearing spindle which projects from the drum body is provided with axial slits and radially projecting latching barbs, which are latched at the upper surface after the projecting edge is slid into an opening of the mounting plate from undernearth. The spindle of the knob can latched in the bearing spindle so that a spindle of the knob which can be slid into the bearing spindle is provided with axial slits and with an annular groove, in which latching lugs on the inner wall of the hollow bearing spindle snap in position.

Finally according to another embodiment of the invention carrier cams are provided on the spindle of the knob, which engage with recesses of the bearing spindle and which establish a connection between the two components.

All the components can be injection-moulded with advantage.

The invention will be described in more detail with reference to the embodiment given in the drawing.

Figure 2:
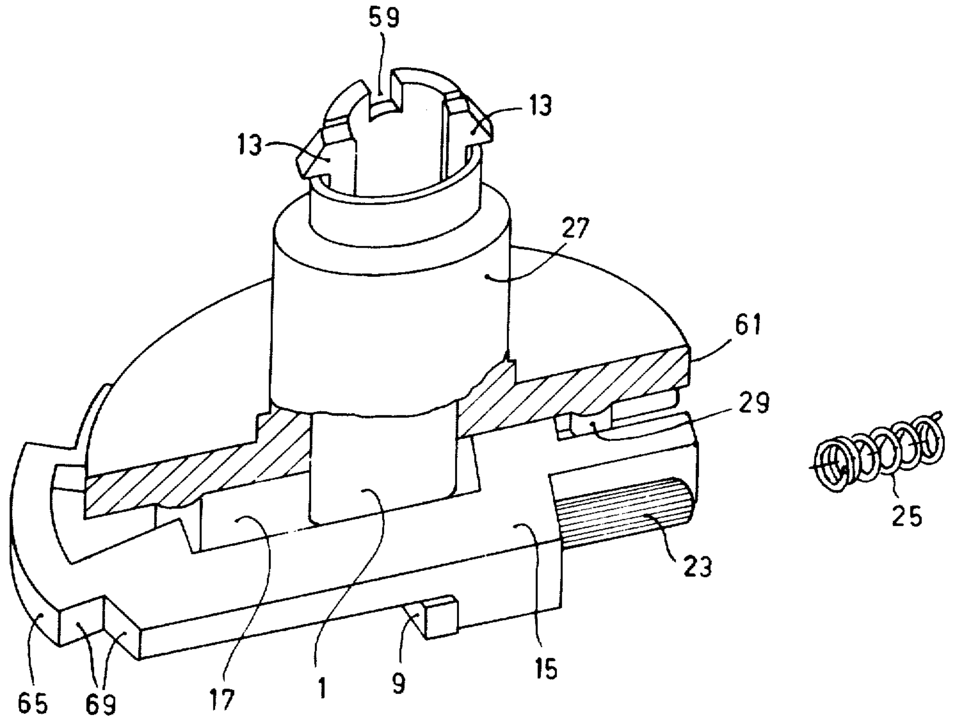
Figure 3:
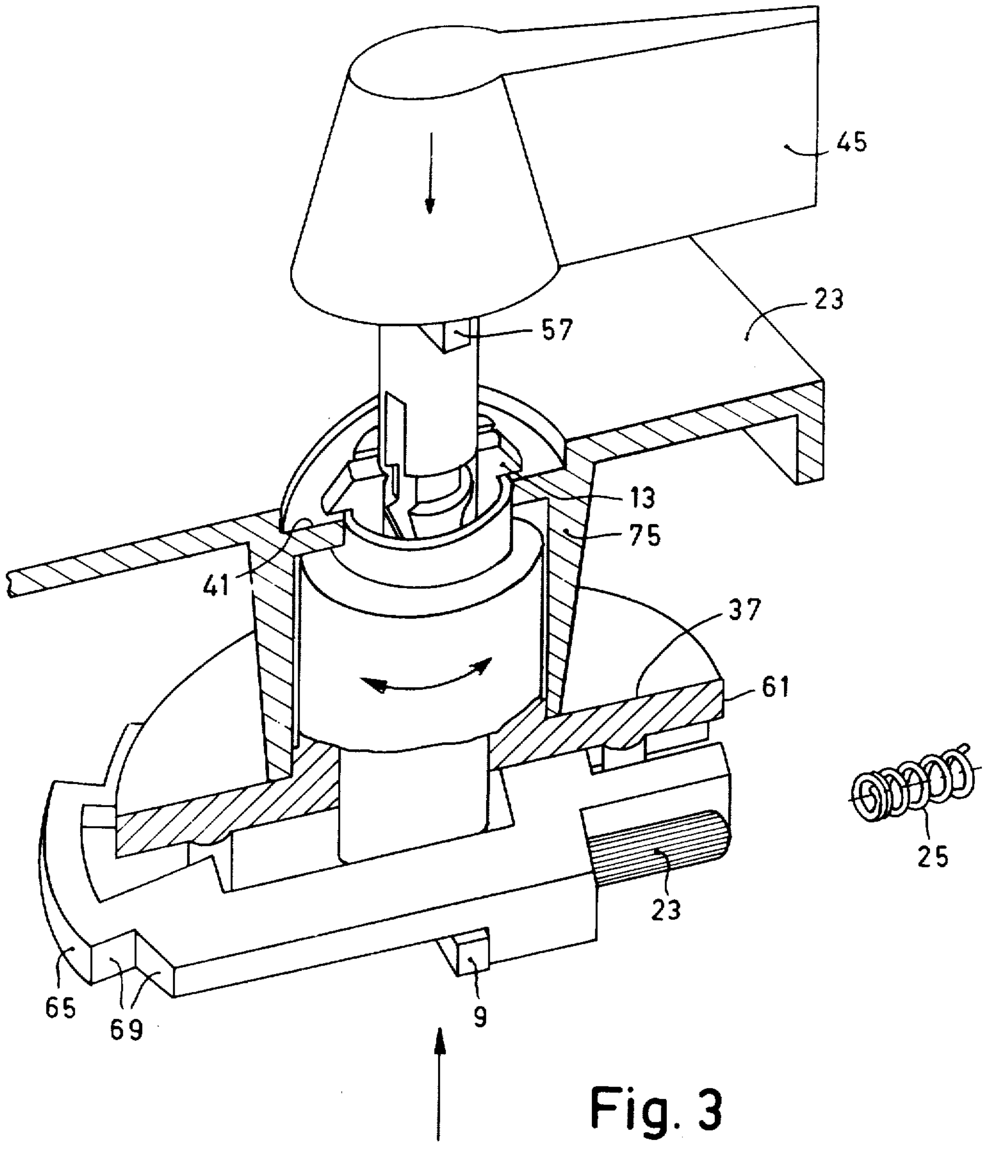

FIG. 1 is an exploded view of the central switching device according to the invention, FIG. 2 shows the actuating device underneath the mounting plate, which is pre-assembled by stacking, and FIG. 3 shows the actuating device, latched in the mounting plate, together with the knob which has been fitted but not yet slid home.

The central component of the central switching device according to the invention is a hollow bearing spindle 1. At the top said hollow bearing spindle 1 is provided with axial slots 3, so that several spindle portions 5 are obtained which can be radially bent relative to each other. Actuating cams 9 which project radially outwards extend beyond the lower end 7 of the bearing spindle. At the upper end 11 of the bearing spindle the individual, radially adjustable spindle portions 5 formed by the slits are provided with latching barbs 13.

On the bearing spindle 1 a slide 15 can be fitted. The slide has a central opening 17, through which the bearing spindle 1 can be inserted. After fitting the slide 17 onto the bearing spindle 1 the faces 19 of the adjustable cams 9 come into contact with the contact faces 21 of the slide 15. The slide 15 is provided with pins 23 which extend in the sliding direction, onto which compression springs 25 can be slid. The ends of the compression springs which are remote from the slide 15 bear against parts, not shown, of a drum body 27.

Subsequently, the drum body can be fitted on the slide 15 which is mounted on the bearing spindle 1. Two pins 29 of the drum body 27 engage with recesses 31 and 33 of the slide 15. The bearing spindle 1 then also extends through a bore 35 of the drum body. As is shown in FIG. 3, the control device which consists of the bearing spindle 1, slide 15 and drum body 27 is assembled and fitted onto the mounting plate 37 of the record player. For this purpose, said plate is provided with a close fitting opening 39. When the bearing spindle on which the parts 15, 27 are fitted is slid into the opening 39, the latching barbs 13 are first moved inwards and after passing through the opening 39 they spring apart at the surface 41 of a collar 43, thus latching the control device to the mounting plate 37.

A switching knob 45 associated with the central switching device is provided with a spindle 47. The spindle 47 has axial slits 49 and is moreover provided with an annular groove 51. When the knob spindle 47 is slid into the bearing spindle 1 the lugs 53 at the inside 55 of the bearing spindle 1 engage with the annular groove 51. Thus, the switching knob is latched in the bearing spindle 1. The switching knob can be fitted and removed without disabling the entire control device.

On the spindle 47 carrier lugs 57 are provided which engage the recesses 59 of the bearing spindle 1. Thus, when the knob 45 is turned it takes along the bearing spindle 1. The bearing spindle 1 in its turn rotates the slide 15 via the cams 9, which slide finally drives the drum body 27. On the outer shell 61 of the drum body surfaces are provided both for scanning the setting-up diameter and for electrically switching on the record player. Accordingly, when the drum body 27 is rotated by means of the knob, the bearing spindle and the slide, the surfaces 61 effect the selection of the setting-up diameter for a certain grammophone record with a certain speed as well as electrical starting of the record player. As the knob is turned and thus the slide 15, the curved stop surface 65 of said slide is scanned by a scanner, during which a scanner 67 can engage with latching cavities 69, so that the apparatus is set to 33 or 45 r.p.m. and remains in this position until it is released.

For guiding the drum body 27 a guide sleeve 75 is molded on the underside of the mounting plate 37. The guide sleeve 75 surrounds a bearing part 77 of the drum body 27, thus ensuring that the drum body 27 is guided on the mounting plate 37 without tilting. The moulded-on sleeve 75, however, may also be dispensed with when the axial length of the drum shell is such that the radial surface 79 of the drum engages the underside 81 of the mounting plate 37.

It is to be noted that the switching device shown in the drawing is represented in a simplified manner for a better understanding of the switching functions. The curved surfaces of the shell 61 may be changed so as to fully comply with the requirements and similarly the slide 15 may be of different design. Further, it is essential that the compression springs 25 uniformly press the slide 15 against the cams 9, so as to ensure proper engagement when the knob 45 is turned towards the zero position as stated.

What is claimed is:

1. A device for switching and control operations in a record player, comprising a bearing spindle having an axis, a radially protruding cam at a lower end thereof and a tubular upper end thereof having a plurality of axially extending resilient portions, said axially extending portions having radially protruding latching bars at their upper ends; a first member having an elongated central opening through which said spindle is inserted such that said first member is retained on said spindle by engaging a top surface of said cam and is rotatable about and slidable diametrically with respect to the axis of the spindle; a second member rotatably mounted on said spindle between said first member and said latching barbs; and means connecting said first and second members so as to rotate said first member in response to rotation of said second member, an upper portion of said second member having an outer circular cylindrical surface coaxial with said spindle, said latching barbs extending beyond said outer surface such that upon insertion of said upper portion of said second member into a close fitting opening in a mounting plate said axially extending portions will be sprung inward so that said barbs may pass through the opening, said barbs engaging an upper surface of the mounting plate when insertion is complete.

2. A device as claimed in claim 1 wherein said first member has a lower axially extending contact face engageable by a side of said radially protruding cam on the bearing spindle, said device further comprising means for biasing said contact face toward said cam such that said first member slides diametrically in response to rotation of said bearing spindle with respect to said first member.

3. A device as claimed in claim 1, further comprising a switching knob having a latching spindle adapted for insertion into said tubular upper end of said bearing spindle, said latching spindle having a lower axially extending resilient portion, means for latchingly engaging said lower axially extending resilient portion in said bearing spindle, and means for rotating said bearing spindle in response to rotation of said knob.

4. A device as claimed in claim 3 wherein said means for latchingly engaging comprises an inwardly protruding lug in said bearing spindle for engaging an annular groove in said latching spindle.

* * * * *